(12) United States Patent
Wei

(10) Patent No.: US 6,829,340 B2
(45) Date of Patent: Dec. 7, 2004

(54) MASKED PHONE SERVICE WITH MASK PHONE NUMBER

(76) Inventor: Tsung-Hsing Wei, 11F No. 285, Yung Ho Rd. Sec. 2, Taipei (TW)

( * ) Notice: Subject to any disclaimer, the term of this patent is extended or adjusted under 35 U.S.C. 154(b) by 41 days.

(21) Appl. No.: 10/414,105

(22) Filed: Apr. 16, 2003

(65) Prior Publication Data

US 2003/0198326 A1 Oct. 23, 2003

(30) Foreign Application Priority Data

Apr. 18, 2002 (TW) .......................... 91108014 A

(51) Int. Cl.[7] ........................ H04M 1/56; H04M 15/06; H04M 3/00; H04M 5/00
(52) U.S. Cl. ........................ 379/142.14; 379/142.02; 379/142.06; 379/142.17; 379/245; 379/247; 455/415
(58) Field of Search .................. 379/88.19, 88.2, 379/88.23, 93.17, 93.23, 142.01, 142.02, 142.06, 142.09, 142.14, 142.17, 245, 247; 455/415

(56) References Cited

U.S. PATENT DOCUMENTS

| | | | | |
|---|---|---|---|---|
| 5,590,184 A | * | 12/1996 | London ................. | 379/142.09 |
| 5,784,444 A | * | 7/1998 | Snyder et al. ......... | 379/142.01 |
| 5,832,072 A | * | 11/1998 | Rozenblit .................. | 379/246 |
| 5,864,612 A | * | 1/1999 | Strauss et al. ......... | 379/142.03 |
| 5,892,821 A | * | 4/1999 | Turner ................... | 379/221.08 |
| 5,901,209 A | * | 5/1999 | Tannenbaum et al. . | 379/142.09 |
| 5,940,515 A | | 8/1999 | Kasavaraju .................. | 380/49 |
| 6,370,519 B1 | | 4/2002 | Kim ............................ | 707/1 |
| 6,449,351 B1 | * | 9/2002 | Moss et al. ............ | 379/142.09 |

* cited by examiner

Primary Examiner—Binh Tieu
(74) Attorney, Agent, or Firm—Stevens, Davis, Miller & Mosher, LLP

(57) ABSTRACT

The present invention disclosed a masked phone service, which depending on phone user's original phone number to virtually create multiple new corresponding substitutive phone numbers, called mask phone numbers; to mask phone user's original phone number when on demand; by adding this new created mask phone number, therefore, to make the phone user have at least two phone numbers on single phone device so that the phone user's original phone number and the mask phone number may be separately used for his working and private time respectively, and by this way the phone user's personal privacy is then improved.

7 Claims, 2 Drawing Sheets

MASKED PHONE SERVICE WITH MASK PHONE NUMBER

BACKGROUND OF THE PRESENT INVENTION

1. Field of the Present Invention

The present invention relates to a new method of protecting telephone user's privacy from disturbance, and more particularly to a method of making a common phone device with two phone numbers separately used for people communication of working and private time respectively.

2. Description of Prior Art

Life with better personal privacy is very important for modern people. Most of people divided private and working territory separately.

Recently, with such a convenient and powerful communicating device, mobile phone rapidly becomes the most important tool or equipment for modern life. Modern people cannot live without his mobile phone in a single day. While people's good private life were heavily interrupted by the mobile phones. The mobile phone can penetrate into any space at any time regardless of any distance.

Due to improve personal privacy, some people maybe buy two or more phone numbers (accounts) for his one phone device. With two SIM (Subscriber Identity Module) chips, people may draw and change different SIM chip for his different time interval and different personal relationship's communication on one phone.

Otherwise, many other people maybe buy two or more phone devices together with different SIM chip equipped directly. These different phone devices are separately used for his different time interval and different personal relationship's communication. Thus, it is very funny and troublesome for a person carrying two or more phone devices with him just for separately used for different people communication or for working and private time respectively.

This invention is to develop a new simplified method to make telephone user have two or more phone numbers on one phone device for his working and private times respectively. With this new invented method, phone user's privacy improved and the cost for phone devices decreased.

SUMMARY OF THE PRESENT INVENTION

The primary object of the present invention is providing a method to have user's original phone number be substituted or masked by a virtual created number. By this way, the present invention makes one phone device with two or more phone numbers that are separately used for communicating with user's working and private territories respectively.

The second object of the new invention is providing a service method to let registered member user may set his new mask number in opened or closed state at any time according to user's demand. With this service, the registered member user may divide his private time and working time separately very easy.

The third object of the new invented service method is to let a registered member user use his original phone number and mask phone number arbitrarily, separately, and independently. When the registered member user set his mask number opened, his original number is masked. At the moment, the connected recipient's phone device will show caller's mask number instead of his original number.

The connected recipient don't see caller's original number and keep the member user's privacy good. When the registered member user set his mask number closed, his original number is exposed and any contacted recipient's phone device will show the caller's original number again.

The fourth object of the new invented service method is to improve registered member user's privacy and ensure better life. When the registered member user set his mask number closed, the only way to communicate with the user is the original phone number. Any people want to contact with the user must dial his original number. At this time, any caller dialing user's mask number will not touch the user temporarily. With this new invented method the masked phone service will protected member user's privacy firmly.

BRIEF DESCRIPTION OF THE DRAWING FIGURES

DETAILED DESCRIPTION OF THE PREFERRED EMBODIMENTS

The present invention disclosed a new method of masked phone service with user's mask phone number. The key point is a computer controlled management system (we defined it as "Masked Phone Service System") that creates a virtual phone number depending on and to substitute member user's original phone number. This substitutive number (we called it "mask phone number") will correspond to and mask user's original phone number in the service system operation.

On the point of view of "Masked Phone Service System", the phone user's mask phone number are created depend on original phone number. Both of 2 numbers are identifiable, interchangeable and corresponding mutually. In the actual telecommunication service system operation, there is only one original number operated.

On the point of view of phone users in the real world, the original phone number and the newly given mask phone number are two independent numbers, which have same shape and same function to dial, and used for different territories of people communication. The users cannot imagine how interchangeable between these two numbers.

When a phone user use original number to communicate other people (set mask number closed), the "Masked Phone Service System" sent message through original phone number, of course. While the user use registered mask number to communicate other people (set mask number opened), the "Masked Phone Service System" will revert the member user's mask number to corresponding original number immediately, sent message through original phone number, as usual. By the method of new invention, the user's original number was masked not disabled temporarily. The member user may apply two different phone numbers separately on one phone device.

Figure 1:
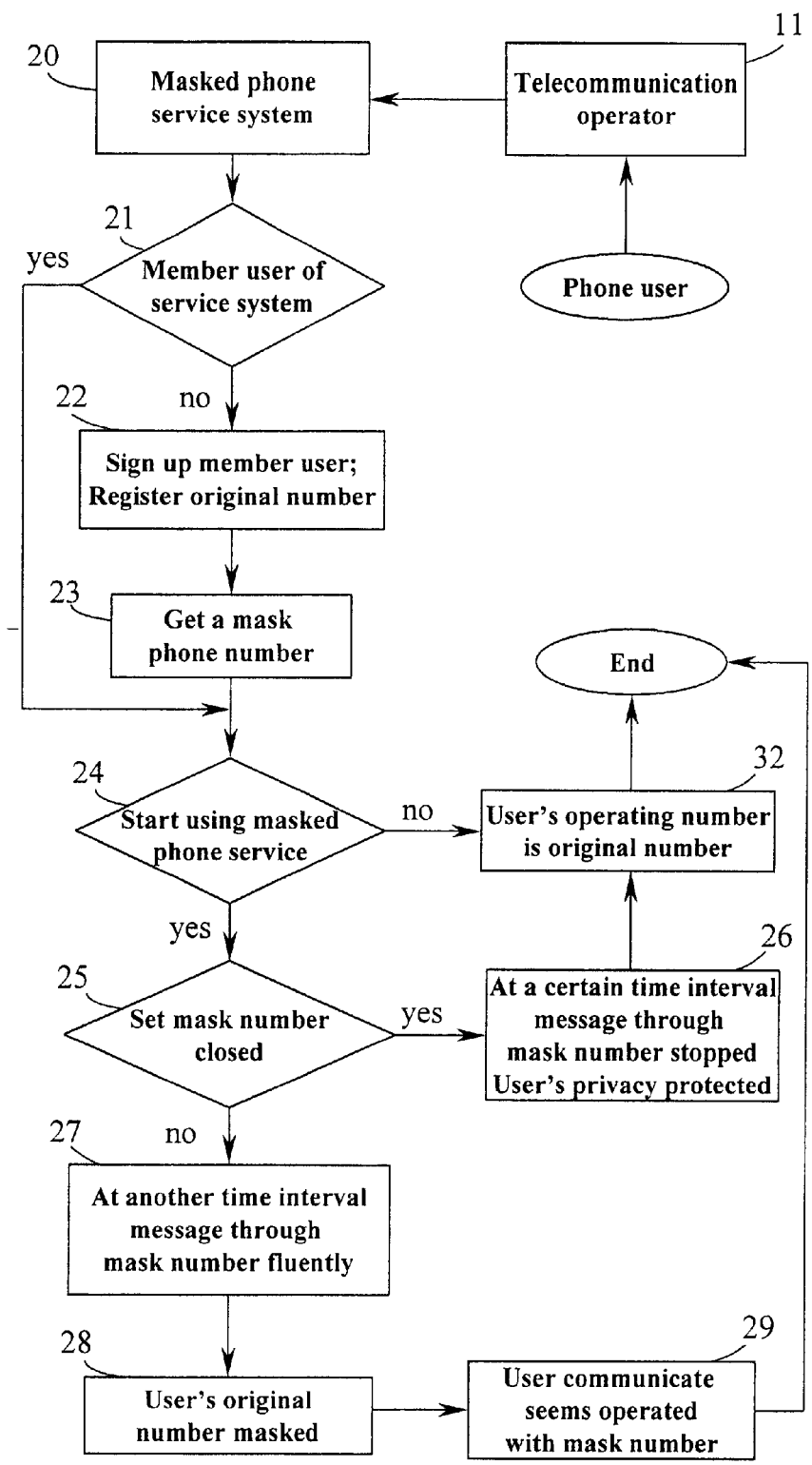
FIG. 1 is a flow chart of the masked phone service of this invention to illustrate how to mask user's original number and protect user's privacy.

Please see our FIG. 1, it explains the user's procedure of operating a mask phone number to mask user's original number and protect user's privacy.

When a Phone user want to use the present invention "Masked Phone Service", the user must enter "Masked Phone Service System" (20) which constructed by a telecommunication operator (11). A new user (21) must sign up to be member user and register his original phone number (22) currently used. "Masked Phone Service System" (20)

will create a mask number (23) depend on user's original phone number.

Before the new member user set his new mask number to be opened (24), any message call out from his phone device will be operated through his original phone number as usual (step 32).

After the new member user of "Masked Phone Service System" decide to start using the "Masked Phone Service" (24) and set his mask number be opened (step 25), the member user communicate outside through his mask number (27). The mask number musk or substitute his original number temporarily (28). All messages call in and out seems to operate through the mask number (29). At this time interval, the certain working territory of people, which communicated user with only mask number, may contact user fluently without any obstacle.

At a certain time of interval, the member user set his mask number closed (25), and the mask number is shut down (26). It means that the user don't want use his mask number to communicate outside, any message through the mask number will be stopped. In the meantime, the user's operating phone number reverts to the only one original number as usual (32). AT this time interval, all messages through user's original phone number may contact user as usual. Any messages through user's mask number will not contact user temporarily.

Figure 2:
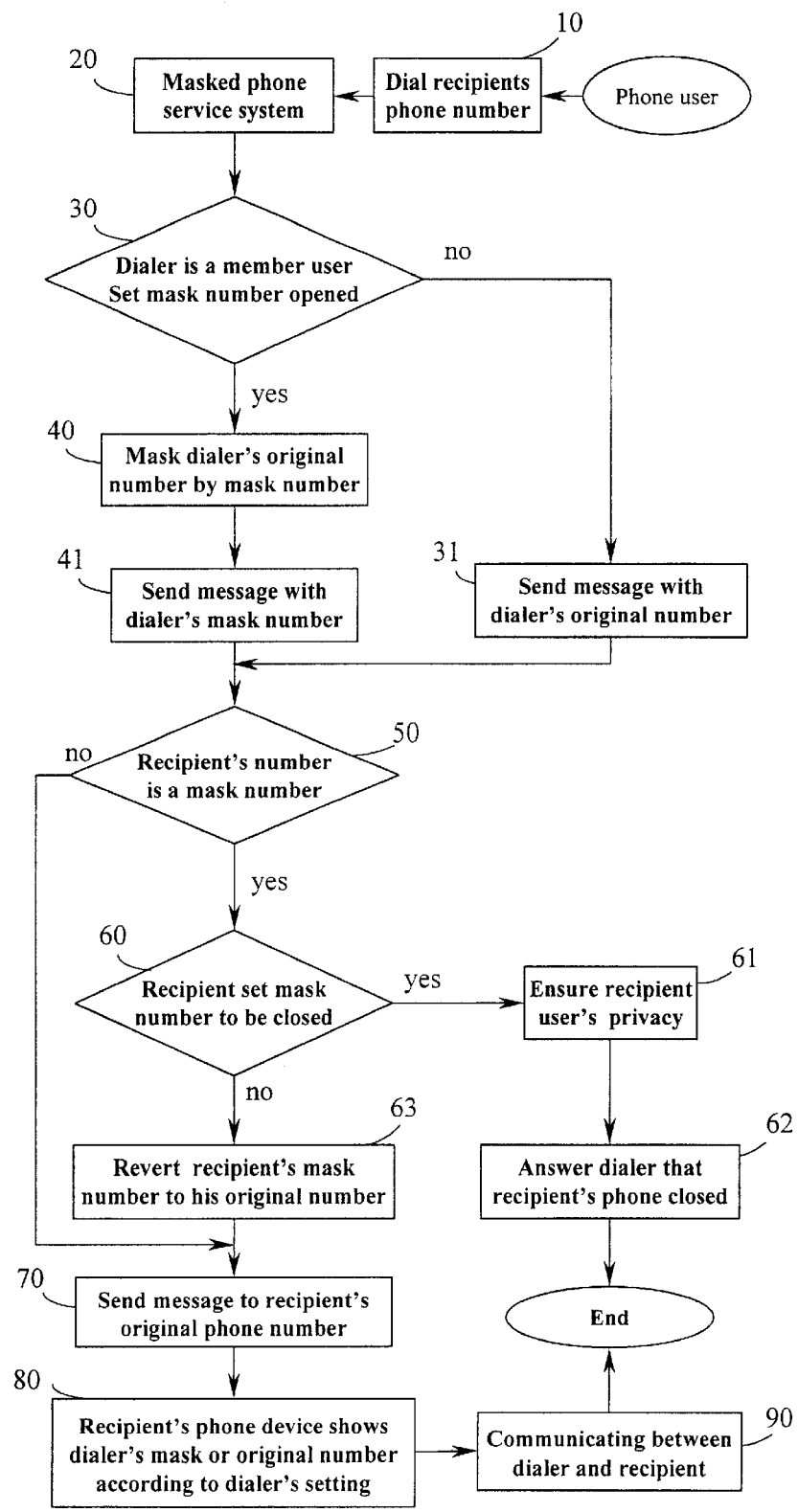
FIG. 2 is a flow chart to illustrate how the masked phone service of this invention operated.

Please see the FIG. 2. It explains how the masked phone service operated. When a phone user dial a recipient's phone number (10), the "Masked Phone Service System" (20) will automatically identify that is the dialer a member user of the new service system (30)?

If the dialer is not a member of the new service system, the system will send message with dialer's original number to recipient (31). The recipient's phone device will show dialer's original phone number (80). If the dialer is identified to be a member user (30) of "Masked Phone Service System", but the mask phone number set to be "closed" state (30), the system will also send message with dialer's original number to recipient (31). The recipient's phone device will also show dialer's original phone number (step 80).

If the dialer is identified to be a member user of "Masked Phone Service System", and the mask phone number set to be "opened" state (40), the system will transfer member dialer's original number to his registered mask number automatically and send message with dialer's mask number to recipient (41). The recipient's phone device will show dialer's mask phone number (step 80). The member dialer's original number masked.

The "Masked Phone Service System" then identifies automatically that is the recipient's phone number a mask number (50)?

If the recipient's phone number is identified not a mask number, that means the recipient is not a member user of the new "Masked Phone Service System". The system will send message to recipient's original phone number (70), and recipient's phone device will show dialer's mask phone number or original number (80) according to dialer's setting state. Both dialer and recipient can be connected and communicated each other (90).

While the system confirmed that the recipient's phone number is a member's mask number (50), then the system check that is the recipient's mask number set "closed" state (60)?

If the recipient's mask number is set "closed" state, it means that the recipient is at his private time, the communication channel of this number closed. To ensure recipient's privacy (61), the "Masked Phone Service System" will answer dialer that recipient's phone device is shutdown state (62). The message through recipient's mask number will be stopped temporarily. Member recipient's privacy ensured.

If the recipient's mask number is set "opened" state (60), it means that the recipient is not at his private time, he would like receive messages through mask phone number. The system will revert recipient's mask number to registered original number automatically (63) and send message to recipient's original phone number (70), and recipient's original phone device will show dialer's mask phone number or original number according to dialer's setting state (step 80). Both dialer and recipient can be connected and communicated each other (90).

By this method, when a member user in his personal private time and private space, he may set his mask number be "closed" state. Thus, all working territory people's communication through this mask or substitutive phone number will be stopped temporarily. The member user's privacy protected. While at this time, the member user's phone device is not shut down in fact. The member user's family and his personal friend may contact him through original private number as usual.

As described above, in the other specified time of interval, the member user set his mask number be "opened" state, the member user's original number masked temporarily. And, all working territory people's communication through this mask phone number operated fluently, no obstacle. At this same time, the member user's family and his personal friend may contact him through original number free as usual.

As described above, the new invented "Masked Phone Service" will make user's one phone device equipped with two phone numbers and used for two different territorial communications. The user's privacy protected while he need not shut down his phone device.

What is claimed is:

1. A service method for masking user's original phone number, depending on user's original phone number to virtually create a corresponding substitutive mask phone number by a Masked Phone Service System controlled by general computer, and to make user's one phone device equipped with two phone numbers separately used for his working time and private time respectively to improve user's personal privacy, which method comprises the following steps:

(a) identifying the membership of the dialer by the Masked Phone Service System;
according to dialer's phone number, the Masked Phone Service System identifying the membership of the dialer automatically;
if the dialer is not a member, the system sending message with dialer's original number to recipient, then the recipient's phone device shows out the dialer's original phone number, then execute (c); or,
if the dialer is identified to be a member user of the Masked Phone Service System, then execute (b);

(b) identifying the status of the dialer's mask phone number;
if the dialer's mask phone number set to be "closed" state, the system sending message with dialer's original number to recipient, the recipient's phone device show out dialer's original phone number, then execute step (c); or
if the dialer's mask phone number set to be "opened" state, the system transferring member dialer's original number to his registered mask number automatically and sending message with dialer's mask number to recipient, the recipient's phone device shows out dialer's mask phone number, then execute step (c);

(c) identifying the membership of the recipient;
   if the recipient's phone number is identified not a mask number, then execute (e); or, if the recipient's phone number is identified a mask number of the system, then execute step (d);

(d) identifying the status of the recipient's mask phone number;
   if the recipient's mask number is set "closed" state, the "Masked Phone Service System" answers dialer that recipient's phone device is shutdown state, then the message through recipient's mask number be stopped temporarily, member recipient's privacy ensured; or,
   if the recipient's mask number is set "opened" state, it means that the recipient is not at his private time, he would like receive messages through mask phone number, the system will revert recipient's mask number to registered original number automatically and execute step (e);

(e) connecting recipient's original phone number, and sending message between dialer and recipient;
   recipient's phone device will show dialer's mask phone number or original number according to dialer's setting state, both dialer and recipient connected and communicated each other.

2. A service method according to claim 1, wherein the original phone number is the phone number of system user's mobile phone number.

3. A service method according to claim 1 wherein the original phone number is the phone number of system user's desktop phone number.

4. A service method according to claim 1 wherein the process of a system user create and operate new mask phone number further comprises the following steps:

(a) registering original number to be a new user of "masked phone service system"

(b) depend on original number, choosing a created corresponding number or a mask phone number used for user's certain time of interval;

(c) setting mask phone number to be "opened" or "closed" state;
      when the user set his mask number "opened", original phone number masked, it looks like to use mask number to communicate with outside recipient; when the user set his mask number "closed", outside dialer cannot contact the user through user's mask number.

5. A service method and the process of a system user create and operate new mask phone number according to claim 4, wherein the system user's original phone number may correspond with multi-number of mask numbers for using on different fields of communication.

6. A service method and the process according to claim 4, wherein the original phone number is the phone number of system user's mobile phone number.

7. A service method and the process according to claim 4 wherein the original phone number is the phone number of system user's desktop phone number.

* * * * *